United States Patent
Reddy et al.

(10) Patent No.: US 11,702,957 B2
(45) Date of Patent: Jul. 18, 2023

(54) SYSTEMS AND METHODS FOR CONTROLLING TEMPERATURE IN A SUPPORTING FOUNDATION USED WITH A GAS TURBINE ENGINE

(71) Applicant: General Electric Company, Schenectady, NY (US)

(72) Inventors: Rajesh K. Reddy, Karnataka (IN); Jeevankumar Krishnan, Karnataka (IN); Avishetti Srinivas, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/453,746

(22) Filed: Nov. 5, 2021

(65) Prior Publication Data
US 2022/0145776 A1    May 12, 2022

(30) Foreign Application Priority Data
Nov. 10, 2020  (IN) .............................. 202011049028

(51) Int. Cl.
*F01D 25/08* (2006.01)
*F01D 25/28* (2006.01)
*F02C 7/20* (2006.01)

(52) U.S. Cl.
CPC ............ *F01D 25/08* (2013.01); *F01D 25/28* (2013.01); *F02C 7/20* (2013.01); *F05D 2220/32* (2013.01);
(Continued)

(58) Field of Classification Search
CPC . F16M 5/00; F01D 25/28; F01D 11/24; F02C 7/20; F05D 2240/91; F05D 2260/231
See application file for complete search history.

(56) References Cited

U.S. PATENT DOCUMENTS

| 2,376,188 A | * | 5/1945 | Roberts .................... F16M 5/00 165/47 |
| 3,313,517 A | | 4/1967 | Hanschke et al. |

(Continued)

FOREIGN PATENT DOCUMENTS

| EP | 3159496 B1 | 5/2018 |
| JP | H06159094 A * | 6/1994 |

(Continued)

OTHER PUBLICATIONS 3M. 3M Nextel Ceramic Fibers and Textiles Technicakk Reference Guide. Oct. 2021. Accessed from https://multimedia.3m.com/mws/media/13270550/3m-nextel-technical-reference-guide.pdf (Year: 2021).*

(Continued)

*Primary Examiner* — Topaz L. Elliott
(74) *Attorney, Agent, or Firm* — Armstrong Teasdale LLP

(57) ABSTRACT

A foundation temperature control system for use with a rotary machine is positioned between the rotary machine and a foundation. The foundation temperature control system includes a heat shield, an insulation pack positioned below the heat shield, and an air gap at least partially defined by the heat shield and the insulation pack. The heat shield, the insulation pack, and the air gap are oriented to facilitate maintaining a temperature of the foundation supporting the rotary machine below a maximum rated operating temperature of the foundation.

19 Claims, 5 Drawing Sheets

(52) U.S. Cl.
CPC .... *F05D 2240/91* (2013.01); *F05D 2260/231* (2013.01)

(56) References Cited

U.S. PATENT DOCUMENTS

| | | | | |
|---|---|---|---|---|
| 3,327,476 | A | * | 6/1967 | Rizk ................... F01D 9/06 60/797 |
| 4,694,895 | A | * | 9/1987 | Wohrl ................ F01D 25/08 165/135 |
| 4,749,298 | A | * | 6/1988 | Bundt ................. F23R 3/60 165/169 |
| 4,826,397 | A | * | 5/1989 | Shook ................ F01D 11/24 415/116 |
| 5,605,438 | A | * | 2/1997 | Burdgick ........... F01D 25/243 415/182.1 |
| 5,814,825 | A | | 9/1998 | Mussman |
| 6,598,389 | B2 | | 7/2003 | Chen et al. |
| 2005/0188673 | A1 | | 9/2005 | Nishimura et al. |
| 2010/0236244 | A1 | | 9/2010 | Longardner |
| 2010/0272558 | A1 | * | 10/2010 | Black ................ F01D 25/14 415/142 |
| 2011/0005234 | A1 | * | 1/2011 | Hashimoto ........ F01D 25/28 60/800 |
| 2012/0195750 | A1 | | 8/2012 | Navjot et al. |
| 2013/0149120 | A1 | * | 6/2013 | Munshi .............. F01D 25/08 415/177 |
| 2014/0123679 | A1 | * | 5/2014 | Lior .................... F02K 1/822 60/801 |
| 2017/0107907 | A1 | * | 4/2017 | Srinivas ............... F02C 6/08 |
| 2018/0051583 | A1 | * | 2/2018 | Griffin ................ F01D 25/24 |

FOREIGN PATENT DOCUMENTS

| | | | |
|---|---|---|---|
| JP | 2834125 | B2 * | 10/1998 |
| JP | 2002303104 | A * | 10/2002 |
| JP | 2018028293 | A * | 2/2018 |

OTHER PUBLICATIONS

Extended European Search Report for EP Patent Application 21205945.5 dated Mar. 23, 2022.

* cited by examiner

SYSTEMS AND METHODS FOR CONTROLLING TEMPERATURE IN A SUPPORTING FOUNDATION USED WITH A GAS TURBINE ENGINE

CROSS-REFERENCE TO RELATED APPLICATIONS

This application claims priority pursuant to 35 U.S.C. 119(a) to India Patent Application No. 202011049028, filed Nov. 10, 2020, which application is incorporated herein by reference in its entirety.

BACKGROUND

The field of the disclosure relates generally to gas turbine engines and, more specifically, to controlling a temperature of a support foundation used with a gas turbine engine.

In at least some known rotary machines, energy extracted from a gas stream in a turbine is used to power a mechanical load. Specifically, at least some known rotary machines include a compressor section, a combustor section, and a turbine section arranged in a serial flow arrangement. The compressor section compresses air for combustion with fuel within the combustor section, and the turbine section extracts energy from the combustion gases generated in the combustor section. The combustor section and the turbine section radiate heat from the combusted gases. Heat generated within the combustor section and the turbine section may radiate out of the rotary machine into a foundation used to support the rotary machine.

At least some known turbine support foundations are fabricated with a maximum rated operational temperature that represents the highest operational temperature that the foundation is rated to be capable of supporting the rotary machine. However, as improvements or replacements are installed, for example, at least some rotary machines may radiate enough heat that the operational temperature of the foundation may be raised above the maximum rated operational temperature. As such, it would be desirable to devise a system for maintaining the temperature of the foundation below the maximum rated operational temperature.

BRIEF DESCRIPTION

In one aspect, a foundation temperature control system for use with a rotary machine is provided. The foundation temperature control system is positioned between the rotary machine and a foundation supporting the rotary machine. The foundation temperature control system includes a heat shield, an insulation pack positioned below the heat shield, and an air gap at least partially defined by the heat shield and the insulation pack. The heat shield, the insulation pack, and the air gap are oriented to facilitate maintaining a temperature of the foundation supporting the rotary machine below a maximum rated operating temperature of the foundation.

In another aspect, a rotary machine is provided. The rotary machine includes a compressor, a combustor, a foundation, and a foundation temperature control system. The compressor is configured to compress a flow of inlet air. The combustor is configured to receive the flow of inlet air and a flow of fuel and to generate heat by combusting the flow of fuel with the flow of air. The heat is radiated from the rotary machine. The foundation is configured to support the rotary machine. The foundation temperature control system is positioned between the rotary machine and the foundation. The foundation temperature control system includes a heat shield, an insulation pack positioned below the heat shield, and an air gap at least partially defined by the heat shield and the insulation pack. The heat shield, the insulation pack, and the air gap maintain a temperature of the foundation below a maximum rated operating temperature of the foundation.

In another aspect, a method of replacing an existing rotary machine supported by a support system with a new rotary machine is provided. The support system includes a foundation and, installed on the foundation, a plurality of vertical supports, a plurality of horizontal supports, and a plurality of base pads supporting the plurality of horizontal supports. The method includes removing the existing rotary machine from the support system. The method further includes installing a foundation temperature control system within the support system. The foundation temperature control system includes a heat shield, an insulation pack, and an air gap at least partially defined by the heat shield and the insulation pack. The method also includes installing the new rotary machine on the support system, such that the foundation temperature control system is between the support system and the new rotary machine. During operation, the new rotary machine radiates heat towards the foundation, and the heat shield, the insulation pack, and the air gap maintain a temperature of the foundation below a maximum rated operating temperature of the foundation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
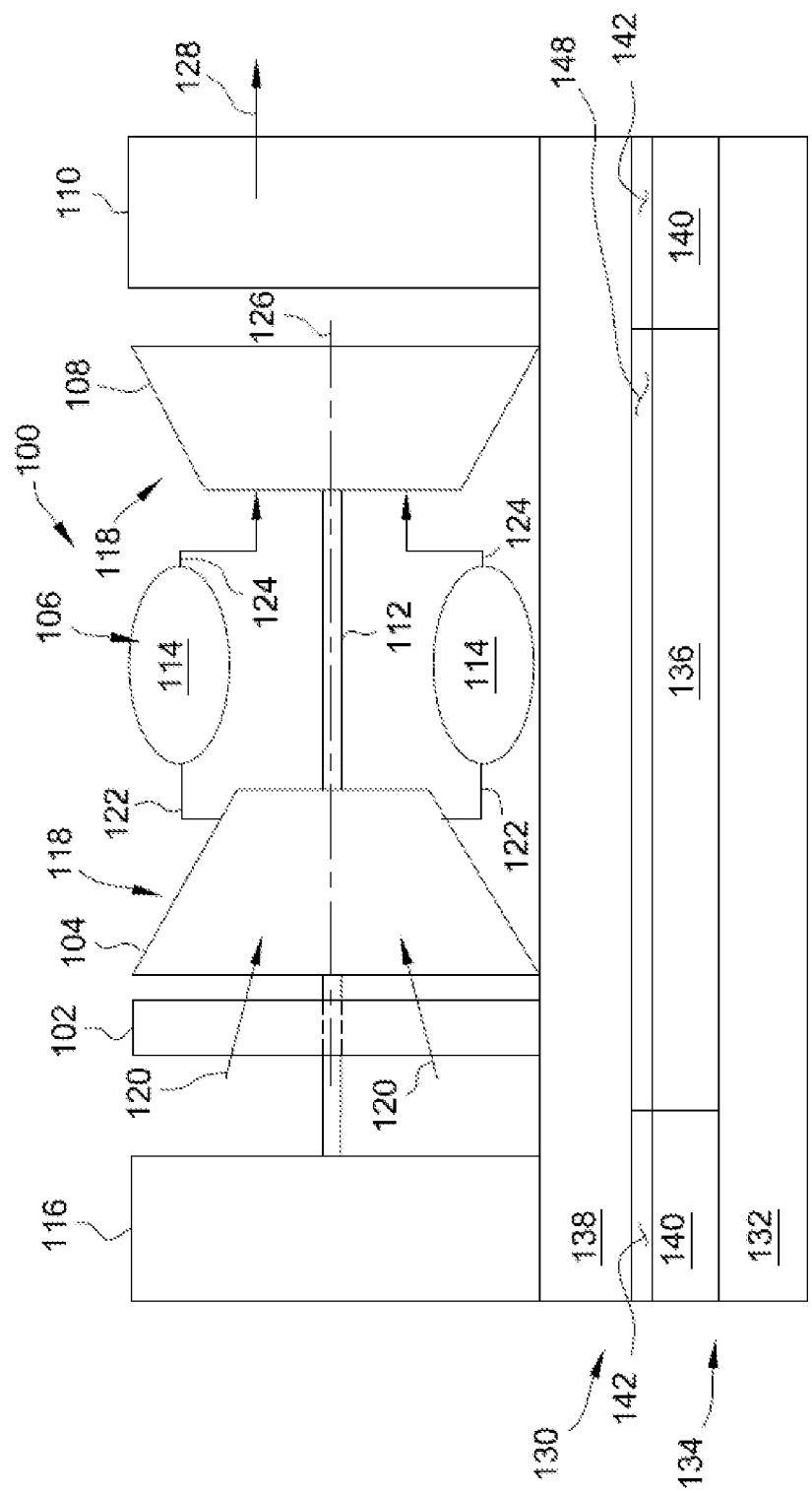
FIG. 1 is a schematic view of an exemplary rotary machine supported by a foundation.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged and include all the sub-ranges contained therein unless context or language indicates otherwise.

Additionally, unless otherwise indicated, the terms "first," "second," etc. are used herein merely as labels and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the terms "axial" and "axially" refer to directions and orientations extending substantially parallel to a longitudinal axis of a rotary machine. Moreover, the terms "radial" and "radially" refer to directions and orientations extending substantially perpendicular to the longitudinal axis of the rotary machine. In addition, as used herein, the terms "circumferential" and "circumferentially" refer to directions and orientations extending arcuately about the longitudinal axis of the rotary machine. Further, as used herein, the term "upstream" refers to a forward or inlet end of a rotary machine, and the term "downstream" refers to an aft or exhaust end of the rotary machine. When discussing a flow of fluid through a component, the direction from which the fluid flows is described as "upstream," and the direction in which the fluid flows is described as "downstream."

The methods and systems described herein relate to systems and methods used to maintain, or control, a temperature of a foundation used to support a rotary machine to facilitate the foundation remaining below its maximum rated operating temperature. More specifically, in the exemplary embodiment, the gas turbine engine includes a compressor, a combustor, and a turbine arranged in a serial flow arrangement. The compressor channels air to the combustor, and the combustor combusts a flow of fuel with the air to generate heat. At least some of the heat is radiated from the rotary machine towards a foundation that supports the rotary machine. Thus, during operation, a temperature of the foundation increases. However, using the systems and methods described herein, the temperature of the foundation may be maintained below a maximum rated operational temperature. The maximum rated operational temperature is the highest operational temperature of the foundation for which the foundation is rated to be capable of supporting the rotary machine.

In the exemplary embodiment, the foundation temperature control system described herein includes a heat shield and an insulation pack that is positioned such that an air gap is at least partially defined between the heat shield and the insulation pack. As such, in the exemplary embodiment, the foundation temperature control system is a layered insulating system arranged to facilitate maintaining the temperature of the foundation below the maximum rated operational temperature during operation of the rotary machine. More specifically, the heat shield and the insulation pack each transfer heat through conduction, while the air gap enables convective heat transfer. Accordingly, the foundation temperature control system resists the transfer of heat with convective and conductive mechanisms.

In the exemplary embodiment, the rotary machine is supported by a support system that includes a plurality of vertical supports, a plurality of horizontal supports, a plurality of base pads, and the foundation. At least some known existing rotary machines may be replaced with newer or different rotary machines that operate with higher operating temperatures. The higher operating temperatures of the replacement rotary machine may increase the temperature of the foundation above its maximum rated operational temperature. However, to facilitate controlling the temperature of the existing foundation, the foundation temperature control systems described herein may be installed within new or existing support systems without altering the existing foundation. Accordingly, the foundation temperature control systems described herein enable existing rotary machines to be replaced with newer or different rotary machines without substantially altering the existing foundation, thus reducing capital costs and reducing construction time.

FIG. 1 is a schematic view of an exemplary rotary machine 100, i.e., a turbomachine, and more specifically a turbine engine. In the exemplary embodiment, rotary machine 100 is a gas turbine engine. Alternatively, rotary machine may be any other turbine engine and/or rotary machine, including, without limitation, a steam turbine engine, a gas turbofan aircraft engine, other aircraft engine, a wind turbine, a compressor, or a pump. In the exemplary embodiment, gas turbine engine 100 includes an intake section 102, a compressor section 104 that is coupled downstream from intake section 102, a combustor section 106 that is downstream from compressor section 104, a turbine section 108 that is downstream from combustor section 106, and an exhaust section 110 that is downstream from turbine section 108. Turbine section 108 is coupled to compressor section 104 via a rotor shaft 112.

It should be noted that, as used herein, the term "couple" is not limited to a direct mechanical, thermal, electrical, and/or flow communication connection between components, but may also include an indirect mechanical, thermal, electrical, and/or flow communication connection between multiple components. In the exemplary embodiment, combustor section 106 includes a plurality of combustors 114. Combustor section 106 is coupled to compressor section 104 such that each combustor 114 is in flow communication with the compressor section 104. Rotor shaft 112 is further coupled to a load 116 such as, but not limited to, an electrical generator and/or a mechanical drive application. In the exemplary embodiment, each of compressor section 104 and turbine section 108 includes at least one rotor assembly 118 that is coupled to rotor shaft 112.

In the exemplary embodiment, rotary machine 100 also includes a support system 130 including a foundation 132, a plurality of supports 134, and a foundation temperature control system 136. Foundation 132 is the underlying base or support structure that rotary machine 100 rests on. Specifically, in the exemplary embodiment, foundation 132 is a concrete pad that supports rotary machine 100. More specifically, in the illustrated embodiment, foundation 132 is a reinforced concrete pad that includes reinforcing materials such as, but not limited to, steel bars. In alternative embodiments, foundation 132 may be any other support structure that enables rotary machine 100 to operate as described herein, including, without limitation, a metallic foundation as found in marine structures, or boats, or any other industrial facility, the ground, and/or any other support structure.

Foundation 132 has a maximum rated operational temperature that represents the highest rated operational temperature of foundation 132 to be capable of supporting rotary machine 100. Specifically, the maximum rated operational temperature is the maximum temperature foundation 132 can have while safely supporting rotary machine 100. The material that foundation 132 is fabricated from at least partially determines the maximum rated operational temperature. In the exemplary embodiment, foundation 132 is a concrete pad that supports rotary machine 100.

During operation, intake section 102 channels inlet air 120 towards compressor section 104. Compressor section 104 compresses inlet air 120 to a higher pressure prior to discharging compressed air 122 towards combustor section 106. Compressed air 122 is channeled to combustor section 106 where it is mixed with fuel (not shown) and ignited to generate high temperature combustion gases 124. Combustion gases 124 are channeled downstream towards turbine section 108 and impinge upon turbine blades (not shown) where the thermal energy is converted to mechanical rotational energy that is used to drive rotor assembly 118 about a longitudinal axis 126. Often, combustor section 106 and turbine section 108 are referred to as a hot gas section of turbine engine 100. Exhaust gases 128 are then discharged through exhaust section 110 to ambient atmosphere or to a steam turbine (not shown), if the rotary machine 100 is a gas turbine that is part of a combined cycle power plant.

As combustors 114 and turbine section 108 operate and are exposed to combustion gases 124, at least some heat is radiated from combustors 114 and turbine section 108 towards foundation 132. At least some known rotary machines 100 radiate enough heat that causes temperature of foundation 132 to increase above the maximum rated operational temperature. Over time, continued operation with foundation 132 above its maximum rated operational temperature may weaken the structural strength of foundation 132. Positioning a foundation temperature control system 136 between foundation 132 and rotary machine 100 facilitates insulating foundation 132 from the radiated heat and thus facilitates maintaining a temperature of foundation 132 below its maximum rated operational temperature.

Figure 2:
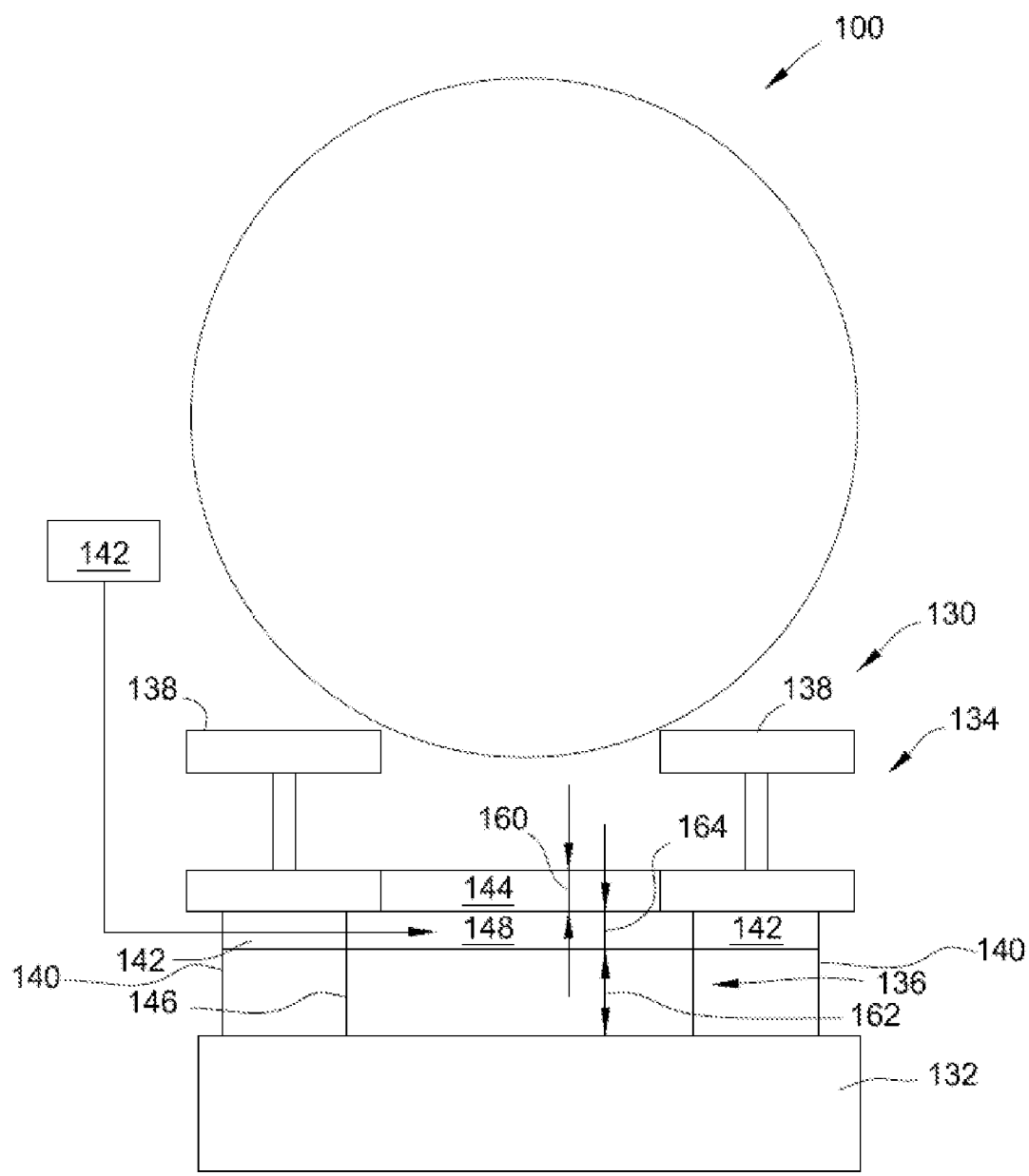
FIG. 2 is a schematic end view of the rotary machine shown in FIG. 1.

FIG. 2 is an end view of rotary machine 100 and support system 130. Support system 130 includes foundation 132, supports 134, and foundation temperature control system 136. In the exemplary embodiment, supports 134 include a plurality of horizontal support beams 138, a plurality of vertical support beams or foundation pedestal base plates 140, and a plurality of base pads 142. Horizontal support beams 138 directly support rotary machine 100 and are coupled to foundation 132 by vertical support beams 140. Base pads 142 are positioned below horizontal support beams 138 and support horizontal support beams 138. In the exemplary embodiment, horizontal support beams 138 and vertical support beams 140 include I-beam supports. In alternative embodiments, horizontal support beams 138 and vertical support beams 140 may be any other type of support that enables support system 130 to operate as described herein.

Foundation temperature control system 136, in the exemplary embodiment, includes a heat shield 144 and an insulation pack 146. Additionally, in the exemplary embodiment, horizontal support beams 138, base pads 142, heat shield 144, and insulation pack 146 are oriented such that an air gap 148 is at least partially defined therebetween. Heat shield 144, insulation pack 146, and air gap 148 facilitate insulating foundation 132 from heat radiated from rotary machine 100. Specifically, the arrangement of heat shield 144, insulation pack 146, and air gap 148 facilitate preventing the temperature of foundation 132 from increasing above the maximum rated operating temperature of foundation 132 during operation of rotary machine 100.

In the exemplary embodiment, heat shield 144 is located between adjacent horizontal support beams 138 and forms a top insulating layer of foundation temperature control system 136. More specifically, air gap 148 is below heat shield 144 and forms a middle, or intermediate, insulating layer of foundation temperature control system 136. Insulation pack 146 is positioned below air gap 148 and extends above foundation 132. In the exemplary embodiment, insulation pack 146 forms a lower insulating layer of foundation temperature control system 136. Heat shield 144 and insulation pack 146 each transfer heat through conduction while air gap 148 transfers heat through convection. The combination of convective and conductive heat transfer of foundation temperature control system 136 facilitates controlling the transfer of heat from rotary machine 100 to foundation 132 and thus facilitates maintaining the temperature of foundation 132 below the maximum rated operating temperature of foundation 132 during operation of rotary machine 100.

Figure 3:
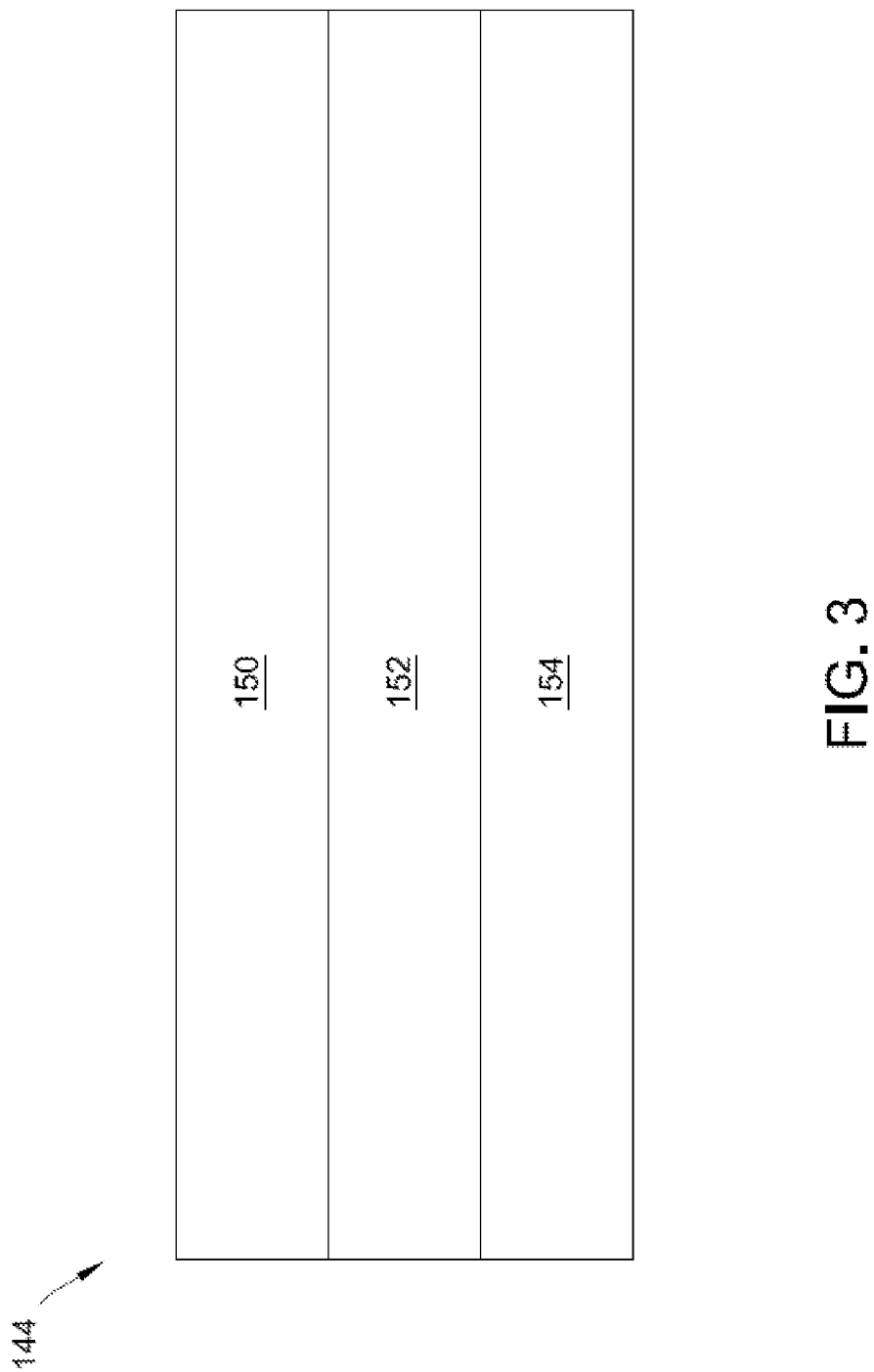
FIG. 3 is a schematic cut-away view of a heat shield used with the rotary machine shown in FIG. 2.

FIG. 3 is a cut-away view of heat shield 144. In the exemplary embodiment, heat shield 144 includes an upper layer 150, a middle layer 152, and a lower layer 154. In the exemplary embodiment, upper layer 150 and lower layer 154 are fabricated from stainless steel plates, and middle layer 152 is formed from an insulating material. In the exemplary embodiment, the insulating material may include fiberglass, mineral wool, cellulose, natural fibers, polystyrene, polyurethane, vermiculite, perlite, and/or any other insulating material or combination of materials that enables heat shield 144 to operate as described herein. In alternative embodiments, upper layer 150, middle layer 152, and lower layer 154 are formed from any material that enables heat shield 144 to operate as described herein. In the exemplary embodiment, upper layer 150 and lower layer 154 each have a first thermal conductivity, and middle layer 152 has a second thermal conductivity that is greater than the first thermal conductivity. The associated materials are variably selected to ensure that the first and second thermal conductivities facilitate maintaining the temperature of foundation 132 below the maximum rated operating temperature of foundation 132 during operation of rotary machine 100. In the exemplary embodiment, the first and second thermal conductivities are between about 0.01 W/m-K and about 0.5 W/m-K.

As shown in FIG. 2, horizontal support beams 138, base pads 142, heat shield 144, and insulation pack 146 are oriented to at least partially define air gap 148. Air gap 148 is sized and oriented to enable a flow of air to be channeled from a source 149 through air gap 148 to an exit (not shown). The flow of air cools a portion of the heat radiated through heat shield 144 prior to the air being channeled to the exit. As such, air gap 148 facilitates removing heat radiated by rotary machine 100 into foundation temperature control system 136, thus reducing an amount of heat induced into foundation 132. More specifically, air gap 148 transfers heat through convection, thus reducing an amount of heat transferred from rotary machine 100 to foundation 132. As such, the temperature of foundation 132 is facilitated to be maintained below the maximum rated operating temperature of foundation 132 during operation of rotary machine 100.

In the exemplary embodiment, source 149 of the flow of air into air gap 148 is a ventilation system for a facility that houses rotary machine 100. In alternative embodiments, source 149 of the flow of air into air gap 148 may be any other source of air that enables air gap 148 to operate as described herein. Additionally, in alternative embodiments, rather than being defined by horizontal support beams 138, base pads 142, heat shield 144, and insulation pack 146, air gap 148 may be a duct or other conduit that extends between heat shield 144 and insulation pack 146 and that is oriented to channel the flow of air as described herein.

Figure 4:
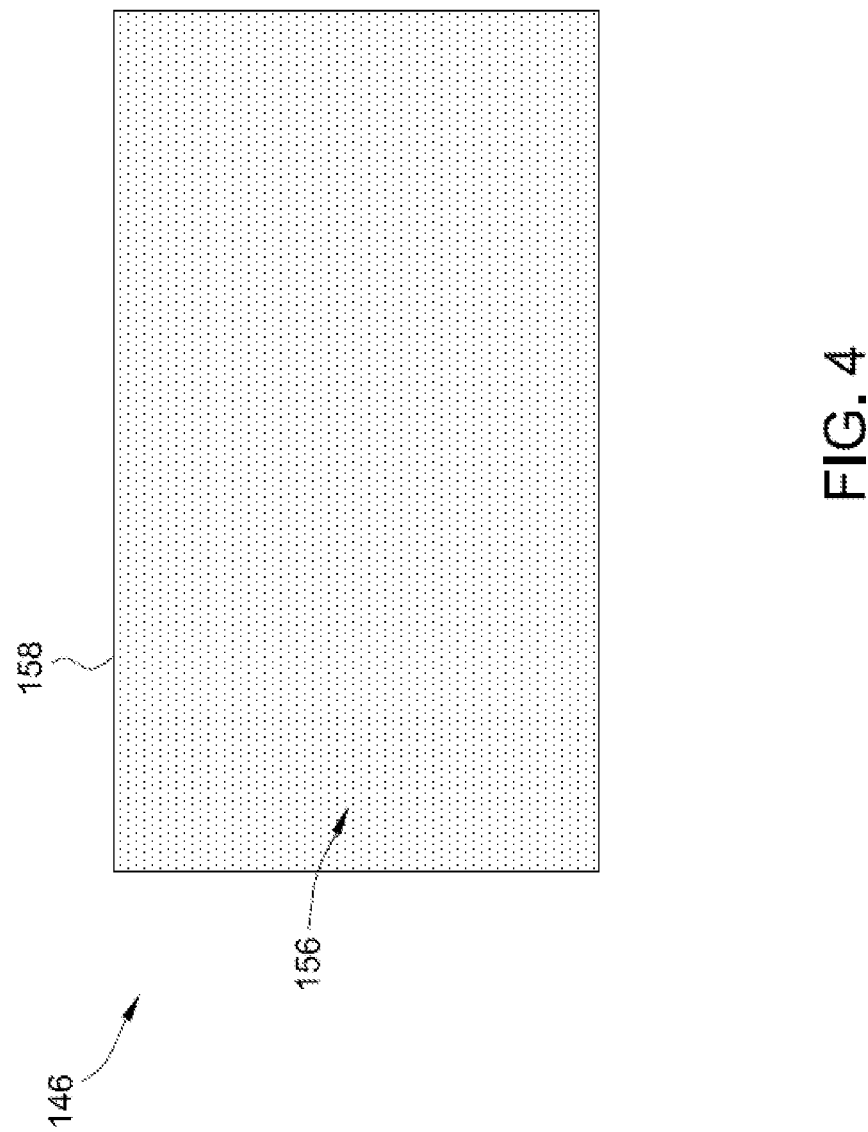
FIG. 4 is a schematic cut-away view of an insulation pack used with the rotary machine shown in FIG. 2.

FIG. 4 is a cut-away view of insulation pack 146. In the exemplary embodiment, insulation pack 146 includes an insulation material 156 and a protective covering 158 that encases insulation material 156. In the exemplary embodiment, insulation material 156 may include fiberglass, mineral wool, cellulose, natural fibers, polystyrene, polyurethane, vermiculite, perlite, and/or any other insulating material or combination of materials that enables insulation pack 146 to operate as described herein. In the exemplary embodiment, protective covering 158 includes a metallic protective covering (i.e., stainless steel) that facilitates shielding insulation material 156 from the environment. In alternative embodiments, protective covering 158 may be formed from any material that enables insulation pack 146 to operate as described herein. In the exemplary embodiment, insulation pack 146 has a thermal conductivity between about 0.01 W/m-K and about 0.5 W/m-K.

In the exemplary embodiment and as indicated in FIG. 2, heat shield 144 has a height 160, insulation pack 146 has a height 162, and air gap 148 has a height 164. In the exemplary embodiment, heat shield height 160 is between about 1 millimeter (mm) to about 500 mm. Specifically, in the illustrated embodiment, heat shield height 160 is about 45 mm. In the exemplary embodiment, insulation pack height 162 is between about 1 mm to about 500 mm. Specifically, in the illustrated embodiment, insulation pack height 162 is about 35 mm. In the exemplary embodiment, air gap height 164 is between about 1 mm and about 500 mm. Specifically, in the illustrated embodiment, air gap height 164 is about 100 mm.

During operation of rotary machine 100, combustion gases 124 heat combustors 114 and turbine section 108 to a degree that heat is radiated from rotary machine 100 towards foundation 132. Foundation temperature control system 136, which is positioned between foundation 132 and rotary machine 100, facilitates insulating foundation 132 from heat radiated from machine 100. Specifically, although heat is radiated towards heat shield 144, heat shield 144 facilitates limiting an amount of heat transferred into foundation 132. A temperature of the portion of heat that radiates through heat shield 144 is reduced by the flow of air within air gap 148. More specifically, the flow of air absorbs a portion of the heat radiated through heat shield 144 and channels any absorbed heat to a discharge of air gap 148. As such, air gap 148 facilitates reducing heat transfer from rotary machine 100 through foundation temperature control system 136 to foundation 132. A temperature of any heat radiating through air gap 148 is reduced by insulation pack 146. Accordingly, foundation temperature control system 136 maintains the temperature of foundation 132 below the maximum rated operational temperature.

Combined heat shield 144, insulation pack 146, and air gap 148 facilitate limiting the amount of heat transferred from rotary machine 100 to foundation 132. Specifically, heat shield 144 and insulation pack 146 each facilitate limiting the amount of heat transferred through conduction while air gap 148 facilitates limiting the amount of heat transferred through convection. As such, foundation temperature control system 136 transfers heat through convection and conduction and facilitates limiting the amount of heat transferred with convective and conductive mechanisms. The combination of convective and conductive heat transfer facilitates limiting the amount of heat transferred from rotary machine 100 to foundation 132 and maintains the temperature of foundation 132 below the maximum rated operating temperature of foundation 132 during operation of rotary machine 100.

At least some existing rotary machines 100 do not radiate enough heat to raise the temperature of foundation 132 above the maximum rated operating temperature of foundation 132 during operation of rotary machine 100. However, newer or replacement rotary machines 100 may have higher operating temperatures and may radiate enough heat to raise the temperature of foundation 132 above the maximum rated operating temperature of foundation 132 during operation of rotary machine 100. At least some power generation facilities may upgrade from the existing rotary machines 100 to the newer or replacement rotary machines 100 in order to generate more power. The existing rotary machines 100 may be removed from foundation 132, and the new or replacement rotary machine 100, including a new support system 130, may be positioned on the existing foundation 132.

Foundation temperature control system 136 is installed within the new support system 130 before the new rotary machine 100 is installed on the new support system 130 to facilitate maintaining the temperature of foundation 132 below the maximum rated operating temperature of foundation 132 during operation of rotary machine 100. That is, the new support system 130 is retrofitted to include foundation temperature control system 136 to facilitate maintaining the temperature of foundation 132 below the maximum rated operating temperature of foundation 132 during operation of rotary machine 100. More specifically, foundation temperature control system 136 is installed on the existing foundation 132 and within the new support system 130 without replacing or modifying the existing foundation 132 and/or the new support system 130. Accordingly, foundation temperature control system 136 enables replacement of existing rotary machines 100 with new rotary machines 100 without replacing or modifying the existing foundation 132, reducing construction costs.

Figure 5:
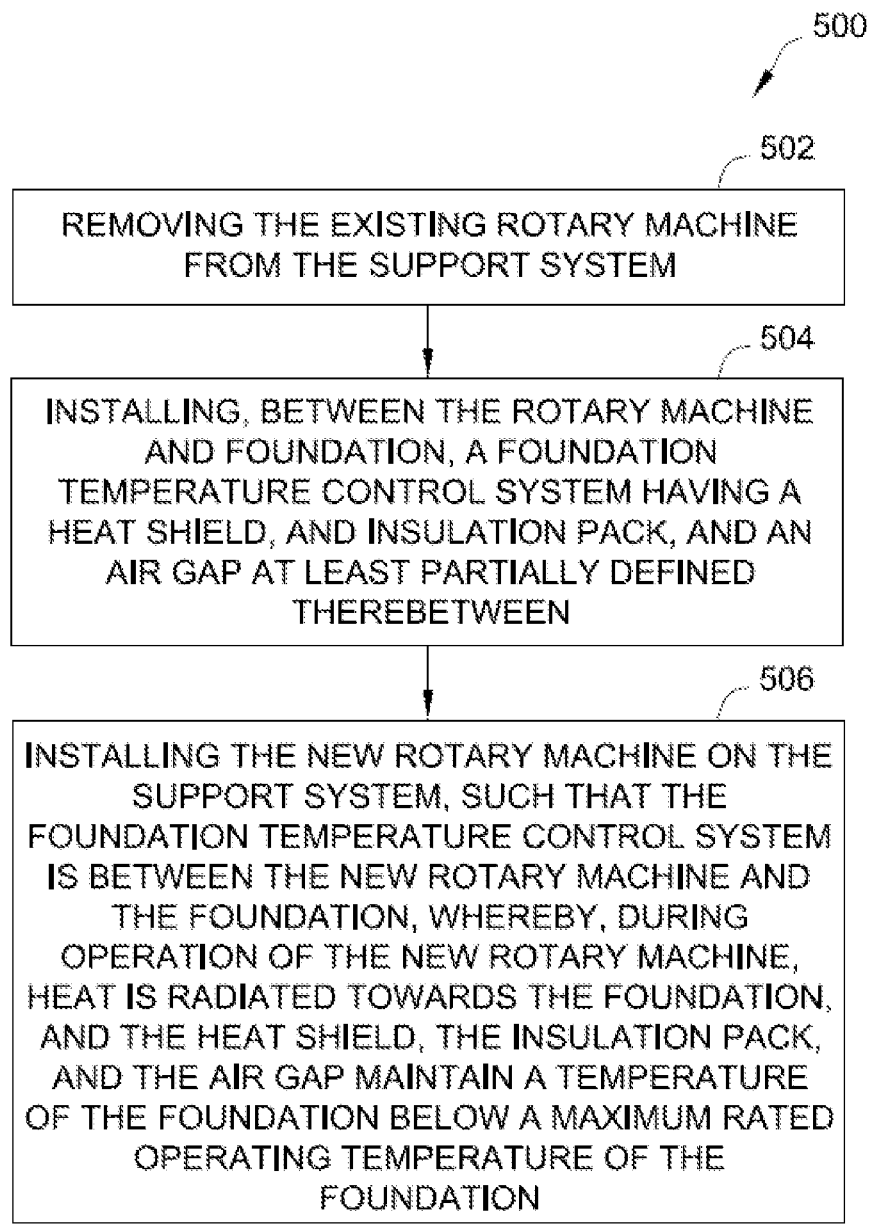
FIG. 5 is a flow diagram of an exemplary method of replacing an existing rotary machine supported by a foundation with the rotary machine shown in FIG. 1.

FIG. 5 is a flow diagram of an exemplary method 500 of replacing an existing rotary machine, supported by a support system, with a newer or different rotary machine. The support system 130 used with the existing rotary machine 100 includes a foundation 130 and, installed on the foundation 130, a plurality of vertical supports 140, a plurality of horizontal supports 138, and a plurality of base pads 142 supporting the plurality of horizontal supports 138. Method 500 includes removing 502 the existing rotary machine from the support system. Method 500 further includes installing 504 a foundation temperature control system within the support system between the rotary machine and the foundation. The foundation temperature control system includes a heat shield, an insulation pack, and an air gap at least partially defined by the heat shield and the insulation pack. Method 500 also includes installing 506 the replacement (new) rotary machine on the support system. As the new rotary machine radiates heat towards the foundation, the heat shield, the insulation pack, and the air gap facilitate maintaining a temperature of the foundation below a maximum rated operating temperature of the foundation.

Optionally, method 500 may also include operating the new rotary machine. Method 500 may further include channeling a flow of air through the air gap (not shown in FIG. 5). The flow of air facilitates removing heat from the foundation temperature control system. Removing 502 the existing rotary machine may further include removing the plurality of horizontal supports, the plurality of vertical supports, and the plurality of base pads from the existing foundation and installing a plurality of new horizontal supports, a plurality of new vertical supports, and/or a plurality of new base pads on the existing foundation. Installing 506 a foundation temperature control system within the support system between the rotary machine and the foundation may also include installing the insulation pack on the foundation and installing the heat shield above the insulation pack such that the heat shield and the insulation pack at least partially define the air gap. Installing 506 a foundation temperature control system within the support system between the rotary machine and the foundation may further include installing the heat shield between the plurality of horizontal supports such that the horizontal supports and the base pad at least partially define the air gap.

The above-described systems and methods relate to a system and method for maintaining a temperature of a foundation of a rotary machine below a maximum rated operating temperature. More specifically, in the exemplary embodiment, the gas turbine engine includes a compressor, a combustor, and a turbine arranged in a serial flow arrangement. The compressor channels air to the combustor, and the combustor combusts a flow of fuel with the air to generate heat. At least some of the heat is radiated from the rotary machine towards a foundation that supports the rotary machine. Thus, during operation, a temperature of the foundation increases. However, using the systems and methods described herein, the temperature of the foundation may be maintained below a maximum rated operational temperature. The maximum rated operational temperature is the highest operational temperature of the foundation for which the foundation is rated to be capable of supporting the rotary machine.

In the exemplary embodiment, the foundation temperature control system described herein includes a heat shield, and an insulation pack that is positioned such that an air gap is at least partially defined between the heat shield and the insulation pack. As such, in the exemplary embodiment, the foundation temperature control system is a layered insulating system arranged to facilitate maintaining the temperature of the foundation below the maximum rated operational temperature during operation of the rotary machine. More specifically, the heat shield and the insulation pack each transfer heat through conduction, while the air gap enables convective heat transfer. Accordingly, the foundation temperature control system resists the transfer of heat with convective and conductive mechanisms.

In the exemplary embodiment, the rotary machine is supported by a support system that includes a plurality of vertical supports, a plurality of horizontal supports, a plurality of base pads, and the foundation. At least some known existing rotary machines may be replaced with newer or different rotary machines that operate with higher operating temperatures. The higher operating temperatures of the replacement rotary machine may increase the temperature of the foundation above its maximum rated operational temperature. However, to facilitate controlling the temperature of the existing foundation, the foundation temperature control systems described herein may be installed within new or existing support systems without altering the existing foundation. Accordingly, the foundation temperature control systems described herein enable existing rotary machines to be replaced with newer or different rotary machines without substantially altering the existing foundation, thus reducing capital costs and reducing construction time.

Additionally, an exemplary technical effect of the systems and methods described herein includes at least one of: (a) maintaining a temperature of a foundation below a maximum rated operational temperature of the foundation; (b) channeling a flow of through an air gap within a foundation temperature control system; and (c) removing heat from the foundation temperature control system.

Exemplary embodiments of systems and methods for maintaining a temperature of a foundation of a rotary machine below a maximum rated operating temperature are described above in detail. The methods and systems are not limited to the specific embodiments described herein, but rather, components of systems and/or steps of the methods may be utilized independently and separately from other components and/or steps described herein. For example, the method may also be used in combination with other rotary machines and is not limited to practice only with the gas turbine engines as described herein. Rather, the exemplary embodiment can be implemented and utilized in connection with many other rotary machine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A foundation temperature control system for use with a rotary machine, said foundation temperature control system positioned between the rotary machine and a foundation supporting the rotary machine, said foundation temperature control system comprising:
   a heat shield comprising an upper layer, a middle layer, and a lower layer, wherein each of said upper layer and said lower layer is a substantially planar plate;
   an insulation pack positioned below said heat shield; and
   an air gap at least partially defined by said heat shield and said insulation pack, wherein said heat shield, said insulation pack, and said air gap are oriented to facilitate maintaining a temperature of the foundation supporting the rotary machine below a maximum rated operating temperature of the foundation.

2. The foundation temperature control system of claim 1, wherein said air gap is configured to channel a flow of air therethrough.

3. The foundation temperature control system of claim 1 wherein said middle layer comprises an insulation material.

4. The foundation temperature control system of claim 1 wherein said upper layer and said lower layer each comprise a stainless steel plate.

5. The foundation temperature control system of claim 1 wherein said upper layer and said lower layer have a first thermal conductivity and said middle layer has a second thermal conductivity greater than the first thermal conductivity.

6. The foundation temperature control system of claim 5, wherein the first thermal conductivity is between about 0.01 W/m-K and about 0.5 W/m-K.

7. The foundation temperature control system of claim 5, wherein the second thermal conductivity is between about 0.01 W/m-K and about 0.5 W/m-K.

8. The foundation temperature control system of claim 1, wherein said insulation pack comprises an insulation material and a protective covering enclosing said insulation material.

9. The foundation temperature control system of claim 8, wherein said protective covering comprises a metallic protective covering configured to protect said insulation material.

10. A rotary machine comprising:
a compressor configured to compress a flow of inlet air;
a combustor configured to receive the flow of inlet air and a flow of fuel and to generate heat by combusting the flow of fuel with the flow of air, wherein the heat is radiated from said rotary machine;
a foundation configured to support said rotary machine; and
a foundation temperature control system positioned between said rotary machine and said foundation, said foundation temperature control system comprising:
a heat shield comprising an upper layer, a middle layer, and a lower layer, wherein each of said upper layer and said lower layer is a substantially planar plate;
an insulation pack positioned below said heat shield; and
an air gap at least partially defined by said heat shield and said insulation pack, wherein said heat shield, said insulation pack, and said air gap maintain a temperature of said foundation below a maximum rated operating temperature of said foundation.

11. The rotary machine of claim 10, wherein said air gap is configured to channel a flow of air therethrough.

12. The rotary machine of claim 11, further comprising a source of the flow of air configured to generate the flow of air.

13. The rotary machine of claim 10, further comprising a support system configured to support said rotary machine.

14. The rotary machine of claim 13, wherein said support system comprises a plurality of vertical supports, a plurality of horizontal supports, and a plurality of base pads.

15. The rotary machine of claim 14, wherein said plurality of horizontal supports and said plurality of base pads at least partially define said air gap.

16. A method of replacing an existing rotary machine supported by a support system with a new rotary machine, the support system including a foundation and, installed on the foundation, a plurality of vertical supports, a plurality of horizontal supports, and a plurality of base pads supporting the plurality of horizontal supports, said method comprising:
removing the existing rotary machine from the support system;
installing a foundation temperature control system within the support system, the foundation temperature control system including a heat shield, an insulation pack, and an air gap at least partially defined by the heat shield and the insulation pack, wherein the heat shield comprises an upper layer, a middle layer, and a lower layer, and wherein each of said upper layer and said lower layer is a substantially planar plate; and
installing the new rotary machine on the support system, such that the foundation temperature control system is between the new rotary machine and the foundation;
whereby, during operation of the new rotary machine, heat is radiated towards the foundation, and the heat shield, the insulation pack, and the air gap maintain a temperature of the foundation below a maximum rated operating temperature of the foundation.

17. The method of claim 16, further comprising channeling a flow of air through the air gap, wherein the flow of air removes heat from the foundation temperature control system.

18. The method of claim 16, wherein installing the foundation temperature control system within the support system comprises installing the insulation pack on the foundation and installing the heat shield above the insulation pack such that the heat shield and the insulation pack at least partially define the air gap.

19. The method of claim 18, wherein installing a foundation temperature control system within the support system further comprises installing the heat shield between the plurality of horizontal supports such that the horizontal supports and the base pads at least partially define the air gap.

* * * * *